US010754494B2

(12) United States Patent
Duncan et al.

(10) Patent No.: US 10,754,494 B2
(45) Date of Patent: Aug. 25, 2020

(54) METHOD AND CONTROL SYSTEM PROVIDING ONE-CLICK COMMISSIONING AND PUSH UPDATES TO DISTRIBUTED, LARGE-SCALE INFORMATION HANDLING SYSTEM (LIHS)

(71) Applicant: DELL PRODUCTS, L.P., Round Rock, TX (US)

(72) Inventors: Tyler B. Duncan, Austin, TX (US); Ty R. Schmitt, Round Rock, TX (US); Anthony P. Middleton, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 546 days.

(21) Appl. No.: 14/748,193

(22) Filed: Jun. 23, 2015

(65) Prior Publication Data
US 2016/0380850 A1    Dec. 29, 2016

(51) Int. Cl.
*G06F 3/0481* (2013.01)
*H04L 12/26* (2006.01)
(Continued)

(52) U.S. Cl.
CPC ..... *G06F 3/04815* (2013.01); *G05B 23/0272* (2013.01); *H04L 41/22* (2013.01);
(Continued)

(58) Field of Classification Search
CPC ... H04L 41/22; H04L 41/0813; H04L 41/082; H04L 43/16; H04L 43/045;
(Continued)

(56) References Cited

U.S. PATENT DOCUMENTS 5,276,789 A   1/1994 Besaw et al.
6,285,967 B1  9/2001 Rajan et al.
(Continued)

FOREIGN PATENT DOCUMENTS

EP    2866382 A1    4/2015

OTHER PUBLICATIONS

Patent Cooperation Treaty (PCT) International Search Report and Written Opinion, PCT/US2016/012550, dated Dec. 26, 2017.
(Continued)

*Primary Examiner* — Tan Doan
(74) *Attorney, Agent, or Firm* — Isidore PLLC

(57) ABSTRACT

A large-scale information handling system (LIHS) includes a plurality of nodes each having at least one functional component. An Interactive, Component-Level Visual Monitoring and Control (ICVMC) system displays on a graphical user interface (GUI) of a display device a selected one of the different levels of visual representations of a plurality of nodes, including a system level, node levels, sub-node levels, and component levels. The ICVMC system displays a control affordance on the display device, receives a selection of the control affordance from a user input component that is capable of manipulating and/or interfacing with one or more items on the GUI, and performs a control action to an identical functional component in each of the plurality of nodes in response to the selection of the control affordance.

20 Claims, 14 Drawing Sheets

(51) Int. Cl.
  *H04L 12/24* (2006.01)
  *G05B 23/02* (2006.01)
(52) U.S. Cl.
  CPC ........ *H04L 43/0817* (2013.01); *H04L 41/044* (2013.01); *H04L 41/046* (2013.01); *H04L 41/0806* (2013.01)
(58) Field of Classification Search
  CPC ..... H04L 43/0817; H04L 43/04; H04L 43/08; H04L 43/00; H04L 43/50; H04L 41/046; H04L 41/0806; G06F 3/04842; G06F 8/65; G06F 8/60; G06F 3/04815; G06F 3/0484; G06F 3/0488; G06T 17/00; G06T 15/00; G05B 23/0272
  USPC ........................................................ 709/223
  See application file for complete search history.

(56) References Cited

U.S. PATENT DOCUMENTS

| | | | |
|---|---|---|---|
| 6,760,908 | B2 | 7/2004 | Ren |
| 7,383,454 | B2 | 6/2008 | Loffink et al. |
| 7,426,571 | B2 | 9/2008 | Chadalavada |
| 7,603,446 | B2 | 10/2009 | Brisse |
| 7,852,627 | B2 | 12/2010 | Schmitt et al. |
| 7,961,463 | B2 | 6/2011 | Belady et al. |
| 8,046,896 | B2 | 11/2011 | Schmitt et al. |
| 8,251,785 | B2 | 8/2012 | Schmitt et al. |
| 8,264,840 | B2 | 9/2012 | Bergthold et al. |
| 8,446,710 | B2 | 5/2013 | Schmitt et al. |
| 8,468,513 | B2 | 6/2013 | Zorn |
| 8,488,960 | B2 | 7/2013 | DeCusatis et al. |
| 8,533,601 | B2 | 9/2013 | LaForest |
| 8,726,002 | B2 | 5/2014 | Perusse, Jr. |
| 8,733,812 | B2 | 5/2014 | Slessman |
| 8,793,587 | B2 | 6/2014 | Sayers |
| 8,880,657 | B1 * | 11/2014 | Angrish ................ G06F 9/5072 709/220 |
| 8,935,701 | B2 | 1/2015 | Bakman |
| 9,100,283 | B2 | 8/2015 | Kraus et al. |
| 2002/0158898 | A1 | 10/2002 | Hsieh et al. |
| 2003/0069797 | A1 * | 4/2003 | Harrison ........... G06Q 10/06311 705/7.21 |
| 2003/0140128 | A1 | 7/2003 | Cox et al. |
| 2004/0148385 | A1 * | 7/2004 | Srinivasan ............ H04L 41/0253 709/224 |
| 2006/0010437 | A1 * | 1/2006 | Marolia ..................... G06F 8/65 717/168 |
| 2006/0082263 | A1 | 4/2006 | Rimler et al. |
| 2006/0155818 | A1 * | 7/2006 | Odenwald ............. H04L 41/082 709/208 |
| 2006/0218510 | A1 | 9/2006 | Ward |
| 2008/0288505 | A1 * | 11/2008 | Dillenberger ........... H04L 41/50 |
| 2009/0089567 | A1 | 4/2009 | Boland, IV et al. |
| 2010/0169876 | A1 * | 7/2010 | Mann ....................... G06F 8/65 717/170 |
| 2012/0200206 | A1 | 8/2012 | Schmitt et al. |
| 2012/0200992 | A1 | 8/2012 | Schmitt et al. |
| 2012/0249588 | A1 * | 10/2012 | Tison ..................... G06F 1/1696 345/633 |
| 2012/0253710 | A1 | 10/2012 | Lehmann et al. |
| 2013/0111275 | A1 | 5/2013 | Ganesan et al. |
| 2013/0173768 | A1 | 7/2013 | Kundu et al. |
| 2013/0232248 | A1 * | 9/2013 | Kraus ..................... G06F 9/466 709/223 |
| 2013/0238795 | A1 | 9/2013 | Gefin et al. |
| 2014/0033201 | A1 | 1/2014 | Dawkins et al. |
| 2014/0122931 | A1 | 5/2014 | Devale et al. |
| 2014/0181292 | A1 | 6/2014 | Venkataswami et al. |
| 2014/0282525 | A1 * | 9/2014 | Sapuram ........... G06Q 30/0631 718/1 |
| 2014/0297569 | A1 | 10/2014 | Clark et al. |
| 2014/0310816 | A1 | 10/2014 | Vrhel et al. |
| 2015/0007086 | A1 * | 1/2015 | Weitzman ............. G06F 3/0484 715/772 |
| 2015/0020050 | A1 | 1/2015 | Dain |
| 2015/0100296 | A1 * | 4/2015 | Chen ....................... H04L 43/50 703/21 |
| 2015/0109332 | A1 | 4/2015 | Manzoni et al. |
| 2015/0169353 | A1 | 6/2015 | Colla et al. |
| 2015/0181747 | A1 * | 6/2015 | Bailey ................ H05K 7/20736 361/679.48 |
| 2015/0253029 | A1 * | 9/2015 | Palmer ................... F24F 11/006 700/276 |
| 2016/0140868 | A1 * | 5/2016 | Lovett ................ G09B 19/0053 434/118 |
| 2016/0283311 | A1 * | 9/2016 | Joshi ................... G06F 11/0766 |
| 2016/0359872 | A1 * | 12/2016 | Yadav ..................... H04L 43/04 |
| 2017/0076256 | A1 * | 3/2017 | Castel ................... G06Q 10/20 |

OTHER PUBLICATIONS

Siemens AG: "Information, System, Q&M System for the BSS (TED:OMS-B); A30808-X3247-D20-D-7618", Jan. 1, 1998 (Jan. 1, 1998), pp. 1-80.
Siemens: "Radio Commander New Operation and Maintenance Center for Today''s and Tomorrow's Networks" Information and Commnications, Oct. 19, 2000 (Oct. 19, 2000), pp. 1-4.
Silvia Batraneanu et al.: "Advanced visualization system for monitomg the ATLAS TDAQ network in real-time", Real Time Conference (RT), 2012 18th IEEE-NPSS, IEEE, Jun. 9, 2012 (Jun. 9, 2012), pp. 1-8.
European Patent Office, European Search Report, Application No. EP16814834, dated Jan. 8, 2019.
Communication, European Patent Office, Application No. 16814834. 4-1216, dated Apr. 16, 2020.

* cited by examiner

METHOD AND CONTROL SYSTEM PROVIDING ONE-CLICK COMMISSIONING AND PUSH UPDATES TO DISTRIBUTED, LARGE-SCALE INFORMATION HANDLING SYSTEM (LIHS)

RELATED APPLICATIONS

The present application is related to the following copending U.S. Patent Applications: Ser. No. 14/748,189; Ser. No. 14/748,199; and Ser. No. 14/748,201, all filed concurrently herewith, with relevant content of each related application being incorporated herein by reference.

BACKGROUND

1. Technical Field

The present disclosure relates in general to enterprise-level monitoring and diagnostic systems, and more particularly to graphical user interface (GUI) control of large-scale information handling systems (LIHS).

2. Description of the Related Art

As the value and use of information continue to increase, individuals and businesses seek additional ways to process and store information. One option available to users is information handling systems (IHSes). An IHS generally processes, compiles, stores, and/or communicates information or data for business, personal, or other purposes, thereby allowing users to take advantage of the value of the information. Because technology and information handling needs and requirements vary between different users or applications, IHSes may also vary regarding what information is handled, how the information is handled, how much information is processed, stored, or communicated, and how quickly and efficiently the information may be processed, stored, or communicated. The variations in IHSes allow for IHSes to be general or configured for a specific user or specific use such as financial transaction processing, airline reservations, enterprise data storage, or global communications. In addition, IHSes may include a variety of hardware and software components that may be configured to process, store, and communicate information and may include one or more computer systems, data storage systems, and networking systems.

Conventional modular data centers (MDCs) and server systems provide discrete monitoring and control systems that do not interface with each other. Whenever a failure, error, or issue is encountered in the MDC and server system that requires evaluation and potential correction, the general nature of the error or failure is identified and passed to a service technician or team. The service technician or team is dispatched to the location of the MDC or server system in which the failure or error was detected. The technician or team has to spend significant time identifying the source of the failure, error, or issue as well as trouble shooting on site to determine what possible solutions exists. This process is time consuming and costly.

BRIEF SUMMARY

In accordance with the teachings of the present disclosure, a Large-Scale Information Handling System (LIHS) includes a plurality of nodes each having at least one functional component. A network interface enables communication with a network over which the plurality of nodes are connected. A memory contains visual representations of the plurality of nodes with a plurality of different levels of visual representations, including a system level, node levels, sub-node levels, and component levels. A display device provides a graphical user interface (GUI) in which each of the different levels of visual representations can be presented. At least one user input component is capable of manipulating and/or interfacing with one or more items on the GUI. An interactive component-level visual monitoring and control (ICVMC) system includes a processor in communication with the display device, the memory, and the network interface. ICVMC program modules execute on the processor and configures the ICVMC system to display, on the display device, a selection on one of the different levels of visual representations, display a control affordance on the display device, receive from the at least one user input component a selection of the control affordance, and trigger performance of a specific control action to an identical functional component in each of the plurality of nodes.

In accordance with embodiments of the present disclosure, an ICVMC system of a LIHS includes a plurality of nodes each having at least one functional component. In one or more embodiments, the ICVMC system includes a network interface enabling communication with a network over which the plurality of nodes are connected. A memory contains visual representations of the plurality of nodes with a plurality of different levels of visual representations, including system levels, node levels, sub-node levels, and component levels. A display device provides a GUI on which each of the different levels of visual representations can be presented. At least one user input component is capable of manipulating and/or interfacing with one or more items on the GUI. A processor is in communication with the display device, the memory, and the network interface. ICVMC program modules execute on the processor and configure the ICVMC system to display on the display device a selected one of the different levels of visual representations, display a control affordance on the display device, receive, from at least one user input component, a selection of the control affordance, and trigger performance of a specific control action to an identical functional component in each of the plurality of nodes.

According to illustrative embodiments of the present disclosure, a method is provided of controlling a LIHS that includes a plurality of nodes each having at least one functional component. In one or more embodiments, the method includes displaying on a GUI of a display device a selected one of the different levels of visual representations of the plurality of nodes, which levels can include a system level, node levels, sub-node levels, and component levels. The method includes displaying a control affordance on the display device. The method includes receiving a selection of the control affordance from a user input component that is capable of manipulating and/or interfacing with one or more items on the GUI. The method includes triggering performance of a control action to an identical functional component in each of the plurality of nodes in response to the selection of the control affordance.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
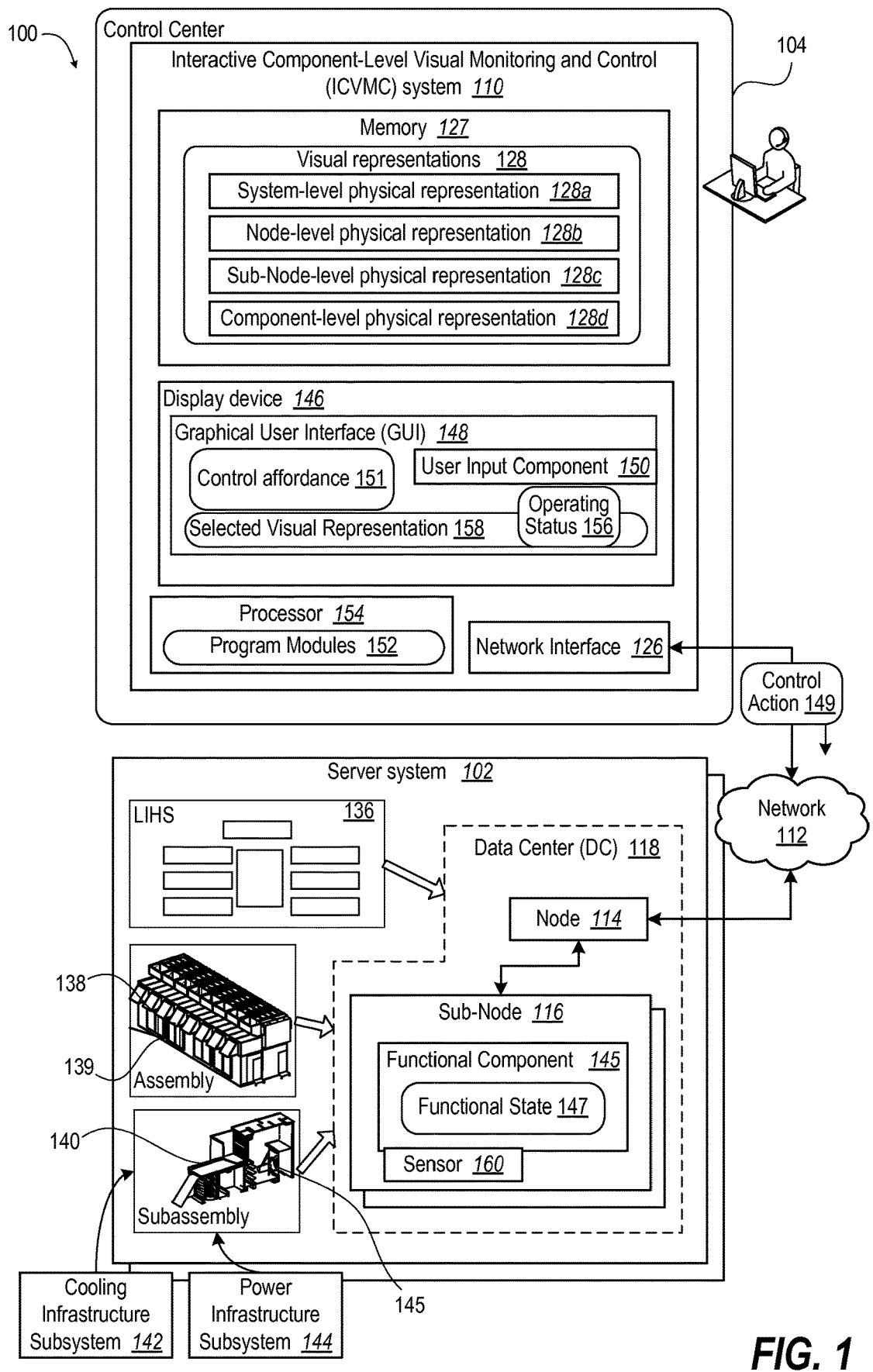
FIG. 1 illustrates a block diagram representation of an example information handling system (IHS) having an Interactive Component-Level Visual Monitoring and Control (ICVMC) System, according to one or more embodiments.

The present innovations provide an Interactive "Component-Level" Visual Monitoring and Control (ICVMC) Module/System for a server system, and with particular application for a server system that is a large-scale IHS (LIHS). In an exemplary embodiment of LIHSes, ICVMC can provide monitoring and diagnostic services for a large-scale modular information handling system (LMIHS) that is a particular type of LIHS based on modular data centers (MDCs) that are networked and centrally managed. In one aspect, ICVMC maps a series of graphical user interfaces (GUIs) linked to different levels and sub-levels of a layout and configuration of hardware devices and firmware components of an information handling system (IHS) such as an MDC or LMIHS. The top level GUI provides a rendering of the general overview of an entire enterprise IHS. From this level, a user is able to drill down to various sub-levels of GUIs representing different parts of device topology. The user can drill down all the way to a device/component level via a series of interactive clicks, touch screen selections, and/or menu selections. Each GUI can present a visual image of physical components at that level or sub-level of the IHS to which the user has drilled down to.

In one or more embodiments, feedback is received from monitors and sensors placed at various devices within the IHS and that feedback enables the program to update the particular GUI capturing the visual representation of the device. When a failure or monitored condition is detected at the device, the signal is transferred back to the ICVMC; in some instances a corrective or mitigating action is automatically taken. In other instances, the location of the failure or event is highlighted at each GUI level at and above the location of the monitored device. Using this graphically displayed information, the user can identify corrective measures required, including providing firmware updates and component resets, etc., without having to dispatch a technician or technician team. When a technician or technician team is required, the exact device that has failed or triggered the condition and its location within the overall IHS as well as specific information on the required fixes, etc., can be sent to the technician or technician team as a troubleshooting ticket that can be delivered electronically (e.g., via email). Faster and more efficient and effective resolution and fixes are implemented whether automated or via a technician.

Monitoring and control of an entire LMIHS from a single user interface or control center can utilize the above ICVMC that is expanded to include the interactive GUIs for each of a plurality of network-connected MDCs and/or a large scale distributed server system to allow monitoring and control across multiple server devices and/or server device locations. ICVMC provides selectable functions or menu items that allows for a one-click commissioning of testing and/or performance of an overall system health check. In one embodiment, the one-click commissioning sequentially checks all of the individual systems, with some overlapping in the sequencing, to allow for faster completion of the test. ICVMC can also provide a selectable function that pushes a fix, patch or update from a single user interface screen to a same component within each of multiple individual server systems. In one or more embodiments, ICVMC can also provide a single point of collection for programmable logic controller (PLC) logs that allows a user to pull log data from any monitored system and to perform manual or automated diagnostics without having to plug in a specific diagnostic tool to each individual MDC/server.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different elements, features, protocols, or concept names are utilized. Thus, each term utilized herein is to be given its broadest interpretation given the context in which that terms is utilized.

FIG. 1 illustrates a block diagram representation of an example information handling system (IHS) 100. In at least one embodiment, because of the relatively large architectural scale of an enterprise, IHS of multiple standalone MDCs and MDCs arranged in a high availability (HA) arrangement as a large-scale information handling system (LIHS) or simply an IHS. Within the general context of IHSs, an information handling system (IHS) 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network storage device, or any other suitable device and may vary in size, shape, performance, functionality, and price. The IHS may include memory, one or more processing resources such as a central processing unit (CPU) or hardware or software control logic. Additional components or the IHS may include one or more storage devices, one or more communications ports for communicating with external devices, as well as various input and output (I/O) devices, such as a keyboard, a mouse, and a video display. The IHS may also include one or more buses operable to transmit communication between the various hardware components. It is appreciated that the IHS described within the present disclosure is a LIHS, with servers acting as the individual processing units.

In one or more embodiments, the IHS 100 can include a server system 102 that is to be interactively monitored at a component level from a control center 104, which can be co-located with or remote to the server system 102. The server system 102 can be one or more rack-mounted servers, a data center (DC) that contains rack-mounted servers, one or more modular data centers (MDCs), or one or more LIHSes. For clarity, an Interactive Component-Level Visual Monitoring and Control (ICVMC) system 110 at the control center 104 communicates over a network 112 with a node 114 and in turn with one or more sub-nodes 116 of a DC 118. The ICVMC system 110 includes a network interface 126 enabling communication with the network 112 over which the node 114 is connected. In one or more embodiments, the network interface 126 can communicate with a local network. In one or more embodiments, the network interface 126 can communicate over a wide area network to geographically dispersed portions of a DC 118.

The ICVMC system 110 includes a memory 127 containing visual representations 128 of the plurality of nodes with a plurality of different levels of visual representations 128, including a system level, node levels, sub-node levels, and component levels. The system level, node levels, sub-node levels, and component levels 128a-128d can be physical representations. For example, a system level visual representation 128a can be an external rendering of three-dimensional computer aided design (CAD) model or photograph of an LIHS 136 that includes more than one MDC 138. A node level visual representation 128b can be an isometric rendering of a CAD model or photograph of an assembly 139, such as one MDC 138. A sub-node level visual representation 128c can be an isometric rendering of a CAD model or photograph of a subassembly 140 of one MDC 138, such as a cooling or power infrastructure subsystem 142, 144. Node level visual representations 128b and/or sub-node level visual representations 128c can include an isometric rendering of a CAD model or photograph of one or more functional components 145. Additional hierarchical representations can be included down to sub-subassemblies, etc. For clarity, some levels of visual representation can include or entail entirely a functional representation such as for components or subsystems that do not lend themselves readily to an isometric or physical view. Examples can include wiring harnesses that are depicted as a wiring schematic.

The ICVMC system 110 can include a display device 146 that provides a graphical user interface (GUI) 148 on which each of the different levels of visual representations 128a-128d can be presented. The ICVMC system 110 can include at least one user input component 150 that is capable of manipulating and/or interfacing with one or more items on the GUI 148.

The ICVMC system 110 can execute ICVMC program modules 152 on a processor 154 in communication with the display device 146, the memory 127, and the network interface 126 to configure the ICVMC system 110 to display on the display device 146 the visual representation 128 of one of the plurality of different system, node subnode levels (e.g., LIHS 136, MDC 138, cooling or power infrastructure subsystem 142, 144) of the IHS 100 based on a current level identified/selected on the GUI 148. The ICVMC system 110 can receive, via the network interface 126, a current functional state 147 of functional components 145 at each component level that is being monitored by one or more sensors 160. The ICVMC system 110 can determine an operating status 156 of the at least one functional component 145 from the current functional state 147 received. The ICVMC system 110 can display on the display device 146 the operating status 156 of the at least one functional component 145 on a selected visual representation 158 at each level of the plurality of different levels when the operating status 156 includes a problem state from among a failed operating state, a malfunctioning state, and/or a check and/or repair (C/R) operating state. For example, a failed operating state can indicate a functional component 145 that is entirely nonfunctional, i.e., has stopped working. A malfunctioning operating state can indicate a functional component 145 that intermittently is nonfunctional. A C/R operating state can be a functional component 145 that is performing its function satisfactorily but is sensed as having an increased likelihood of failure. For example, the service count is high, a sensor reading is out of a normal operating range, such as for power consumed or temperature, etc. The ICVMC system 110 can, in response to receiving a user input selecting a specific component level among the one or more levels that is different from a current level being displayed, modify the GUI 148 to display the visual representation 128a-128d of the specific component level and identify any components having the problem state. In one or more embodiments, the ICVMC system 110 can determine an opportunity and for corrective action for certain components. In response to the determined opportunity, the ICVMC system 110 can automatically trigger performance of a control action 149 over the network 112 to identical functional components 145 on different nodes 114. In one or more embodiments in response to determining the opportunity, ICVMC system 110 displays a control affordance 151 for manipulation/selection by the user input component 150 to trigger the control action 149.

Figure 2:
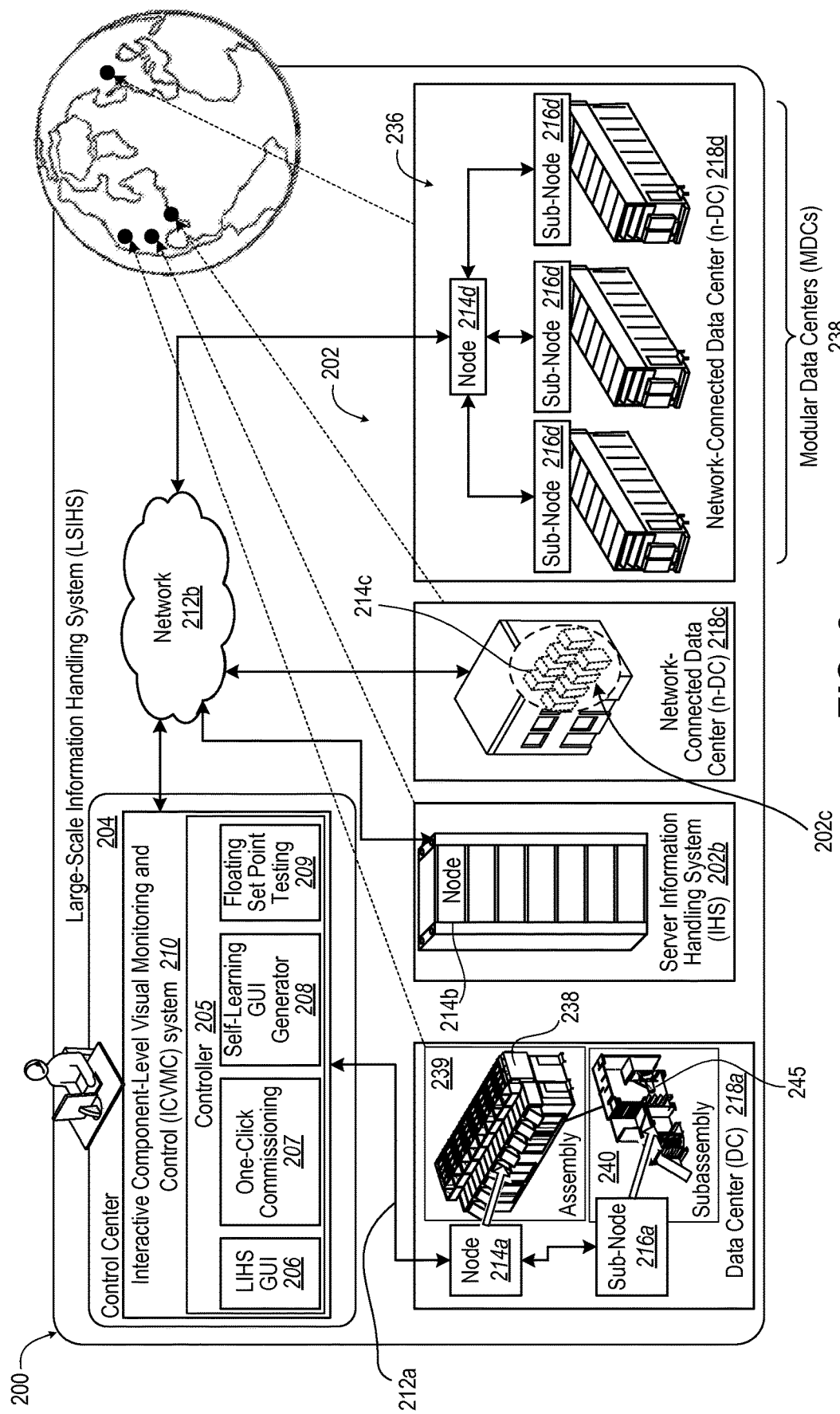
FIG. 2 illustrates an example Large-Scale Information Handling System (LIHS) having server systems that are monitored and controlled by a control center by using an ICVMC system, according to one or more embodiments.

FIG. 2 illustrates an example LIHS 200 having server systems 202 that are monitored and controlled by a control center 204 by using an ICVMC system 210 having a controller 205 that executes ICVMC program modules. In an exemplary embodiment, the controller 205 executes an LIHS GUI program module 206, a one-click commissioning program module 207, a self-learning GUI generator program module 208, and a floating set point testing program module 209. In one or more embodiments, the ICVMC system 210 manages a node 214a and sub-nodes 216a via a local network 212a of a local DC 218a. For example, the local DC 218a can be an MDC 238 that includes assemblies 239 and subassemblies 240 containing functional components 245. In one or more embodiments, the ICVMC system 210 manages a node 214b of rack-mounted server system 202b over a geographically distributed network 212b. In one or more embodiments, the ICVMC system 210 manages a node 214c of a network-connected data center (nDC) 218c having rack-mounted server systems 202c over the geographically distributed network 212b. In one or more embodiments, the ICVMC system 210 manages over the geographically distributed network 212b a node 214d of a network-connected data center (nDC) 218d that includes an LIHS 236 having sub-nodes 216d of MDCs 238.

In an exemplary embodiment, the ICVMC system 210 can perform one or more interactive control functions that are enabled by monitoring systems. Certain functions are automated and others facilitate control by a human operator. For example, LIHS GUI program module 206 can intuitively utilize CAD models that have problem areas illuminated with semi-transparent overlays. The operator can select areas such as by touching a touch screen to drill down in the GUI to a next deeper level view. The GUI can be provisioned with and/or identify all functional components and sensors as well as visually indicate their geographic or relative physical location on CAD models or other physical renderings. In addition to drilling down to component-level visual information, the ICVMC system 210 can facilitate as a unified tool moving to upper levels to quickly visualize an operational layout and operating status of a data center or LIHS. The ICVMC system 210 can trigger pushing control code to functional components 245 for correcting a malfunction or to perform diagnostic testing.

The one-click commissioning program module 207 of the ICVMC system 210 can provide a single button to push updates or customizations to global data centers. The one-click commissioning program module 207 can also or alternatively provide an automated procedure to test all devices on a module and report the results of each test. The self-learning GUI generator program module 208 of the ICVMC system 210 can change between left and right modules in a setup of an MDC or an LIHS. The self-learning GUI generator program module 208 of the ICVMC system 210 can auto-detect device configuration.

The floating set point testing program module 209 of the ICVMC system 210 can have common control code while utilizing a separate configuration file to set customer/site specific set points for customized operation. The floating set point testing program module 209 can push control code to functional components 245 to perform diagnostic testing and can retrieve diagnostic information, such as programmable logic controller (PLC) logs. The ICVMC system 210 can also perform testing of a communication system across the LIHS 200 by decoupling control code from communication outputs. For example, a single button control can set unique values to all analog registers to prove true one-to-one correspondence. For another example, automatic cycling through all registers can be performed at a user-defined speed to test that all binary registers are received by third-party software. The floating set point testing program module 209 can use persistent variables for all set points, which are modifiable by commissioning and administer user levels. The floating set point testing program module 209 can return all set points to factory defaults after commissioning user level is completed. The floating set point testing program module 209 can enable floating set points to optimize power while controlling temperature and humidity for specific portions of the LIHS 200.

Figure 3:
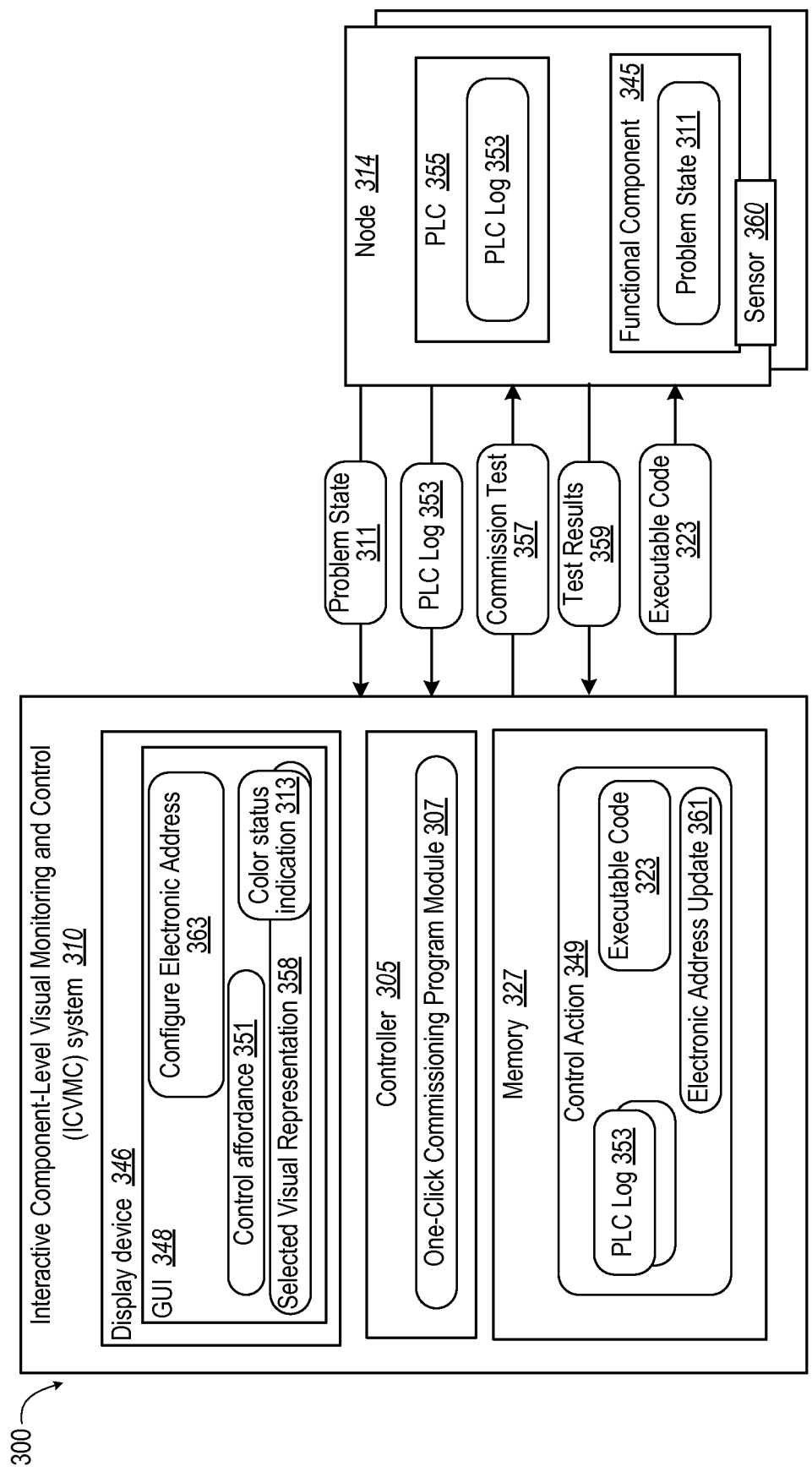
FIG. 3 illustrates an LIHS in which the ICVMC system executes a one-click commissioning program module to trigger performance of a specific control action to or at identical functional components of different nodes of the LIHS, according to one or more embodiments.

FIG. 3 illustrates an LIES 300 in which a controller 305 of an ICVMC system 310 executes an LIES GUI program module to display a color status affordance 313 of a problem state 311 reported by a sensor 360. In a particular embodiment, the status affordance 356 is displayed on a display device 346 by overlaying a color status affordance 313 at a corresponding component location on a physical representation 358 of each higher level displayed on the display device 346. The controller 305 executes a one-click commissioning program module 307 to (a) display on the display device 346 a selected one of the different levels of visual representations 358; (b) display a control affordance 351 on the display device 346; (c) receive from the at least one user input component a selection of the control affordance 351; and (d) triggering performance of a specific a control action to an identical functional component in each of the plurality of nodes.

In one or more embodiments, the control action 349 can include the ICVMC system 310 collecting a log file from each of the plurality of nodes 314. For example, the log file can be a programmable logic controller (PLC) log file 353 that is generated by a PLC 355. The controller 305 can perform diagnostics of the respective node 314 by analyzing the collected log files 353. In one or more embodiments, the control action 349 can include the ICVMC system 310 commissioning each node 314 to perform overlapping tests 357 of/on the identical functional components 345. The control action 349 can include the ICVMC system 310 then receiving test results 359 from sensors 360 from each respective node 314.

In one or more embodiments, the memory can contain executable code 323 for correcting a problem state of the functional component 345, where the code can include code for implementing/triggering a malfunction mitigating mode of operation for the functional component and/or code associated with an upgrade firmware for execution by the functional component. Performing the control action 349 can include the controller 305 directing installation of the executable code 323 on the functional component 345.

In one or more embodiments, the plurality of nodes includes a modular data center that contains server systems. The controller 305 can perform the control action 349 by associating the selection of the control affordance 351 to a select set of two or more modular data centers and directing installation of the executable code 323 at the modular data centers of the select set.

In one or more embodiments, the controller 305 receives an update 361 to an electronic address list of information technology (IT) technicians associated with respective ones of the plurality of nodes 314. For example, vendors or employees that are tagged for performing certain maintenance activities at specified locations can change over time. A directory that is maintained for this purpose can be periodically updated by a user via an electronic address configuration interface 363 on a GUI 348 to change an electronic address update 361 in memory 327. The controller can identify a required IT technician by accessing the updated directory. In one or more embodiments, the portions of the directory that are pertinent to a particular node 314 are used at that node 314. Thus, the update 361 can be required to direct actions to the affected node 314. Thus, the controller 305 can perform the control action 349 by enabling the electronic address update 361.

In one or more embodiments, the visual representations 358 can include three-dimensional CAD models. The controller 305 can display the visual representations 358 by rendering the CAD models at a user selected spatial orientation.

Figure 4:
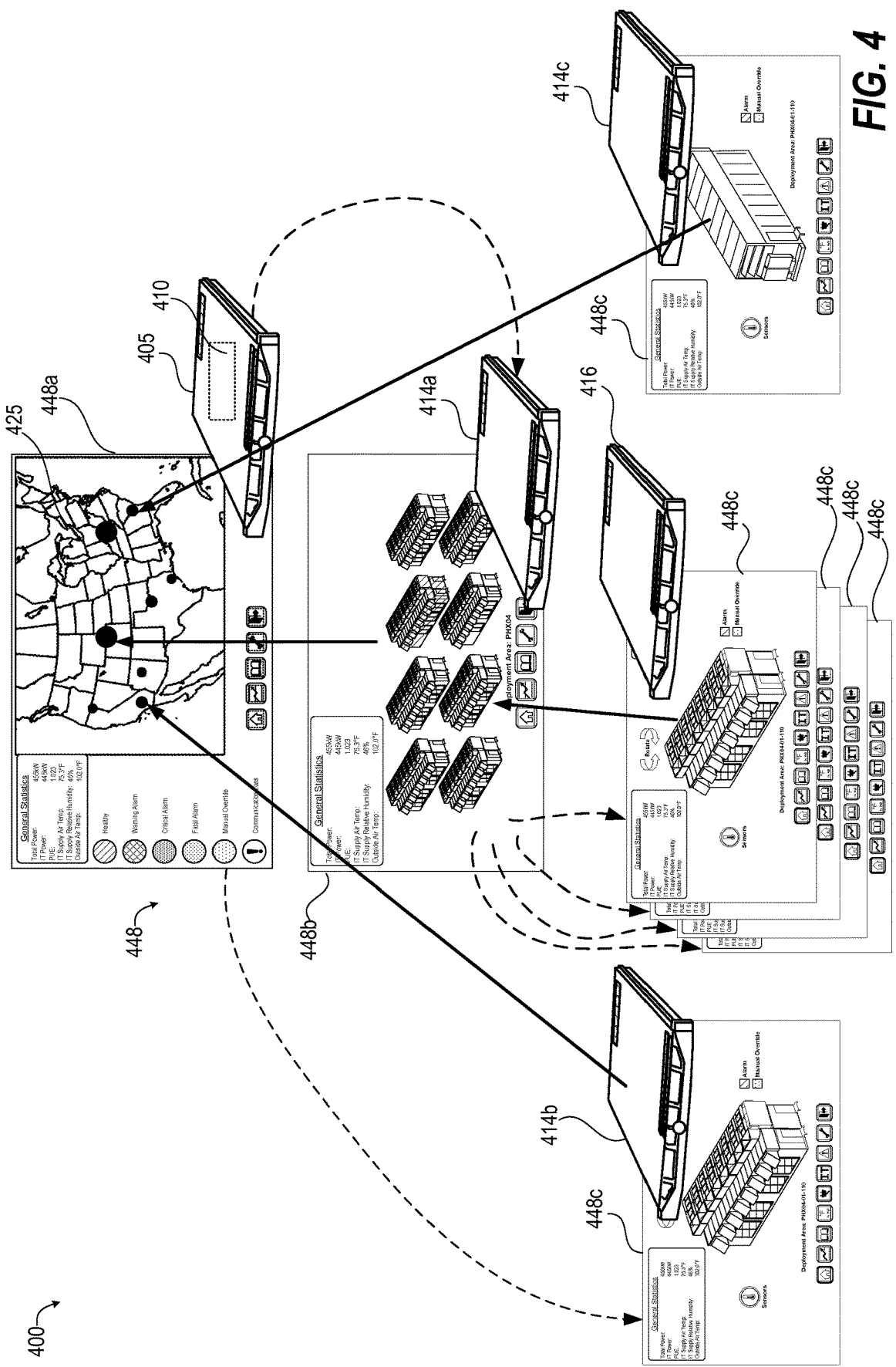
FIG. 4 illustrates a multi-tiered LIHS with an ICVMC system including a controller to monitor and control nodes and a sub-node using a multi-tier GUI, according to one or more embodiments.

FIG. 4 illustrates an LIHS 400 that is multi-tier with an ICVMC system 410, which includes a controller 405 to monitor and control nodes 414a-414c and a sub-node 416 using a multi-tier GUI 448. The GUIs can be multi-tier by presenting the LIHS 400 in different levels of detail and granularity. A fault at a particular geographic location can be presented in an upper level view. A user can drill down through tiers or levels in a hierarchy of GUIs to follow the fault to one or more contributing functional components or subsystem of functional components. In one or more embodiments, an upper level GUI 448a can depict a geographical view 425 with locations and operating status of server systems annotated. A user input to a location can link to a large-scale system level GUI 448b, which can include a data center layout of multiple MDCs. A user input to a particular MDC on the large-scale system level GUI 448b can link to one of more than one system-level GUIs 448c. Other locations on the upper-level GUI 448a can link directly to a system-level GUI 448c for smaller data centers. The levels can also be referred to as nodes and sub-nodes. Additional levels of GUIs can be provided in other implementations, and the presentation herein of a specific subset of GUIs is not intended to limit or be viewed as a limitation on the actual numbers of levels utilized and/or available to be accessed and displayed.

Figure 5:
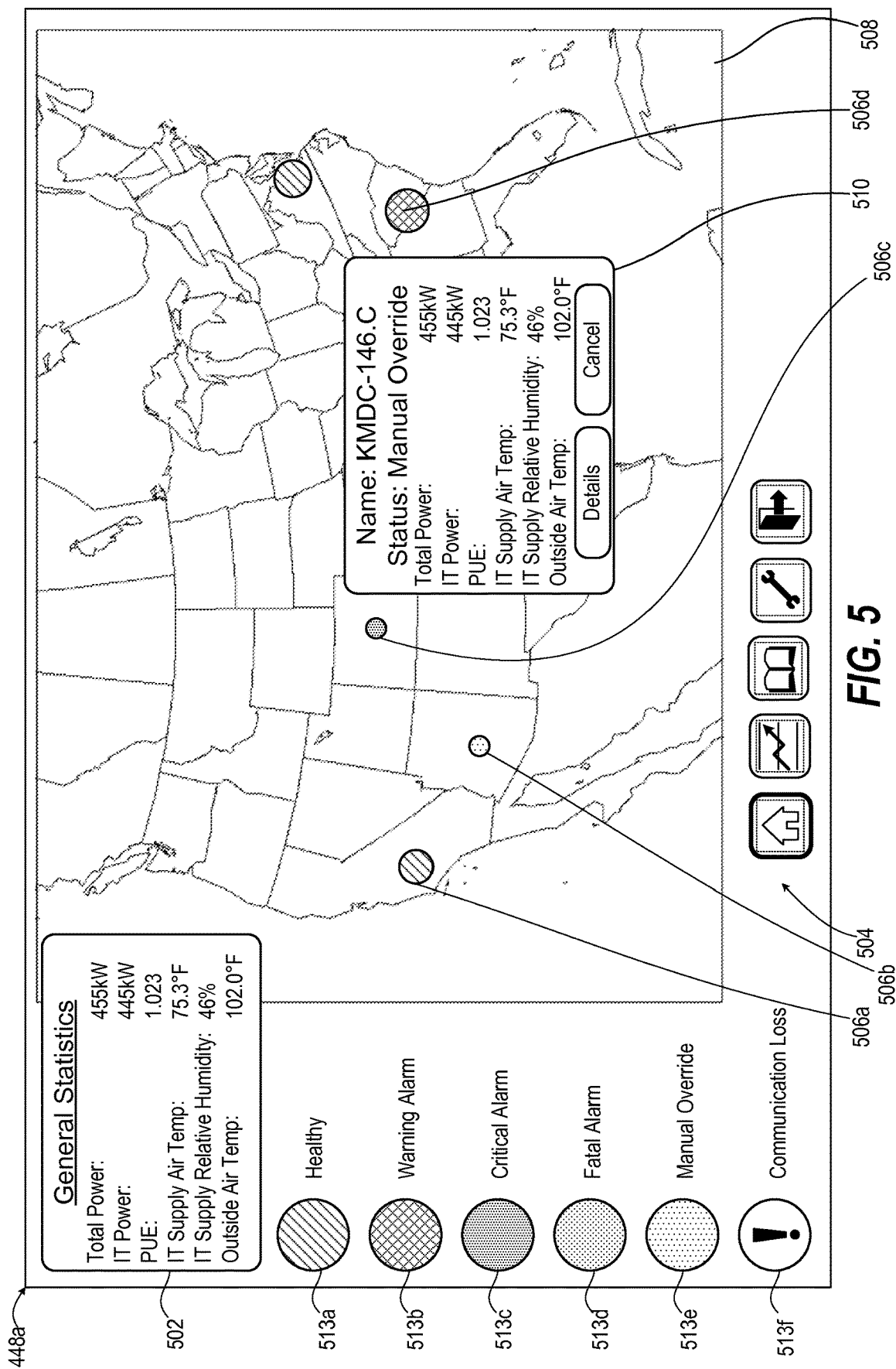
FIG. 5 illustrates an upper-level GUI with location annotations on a geographic map, according to one or more embodiments.
Figure 6:
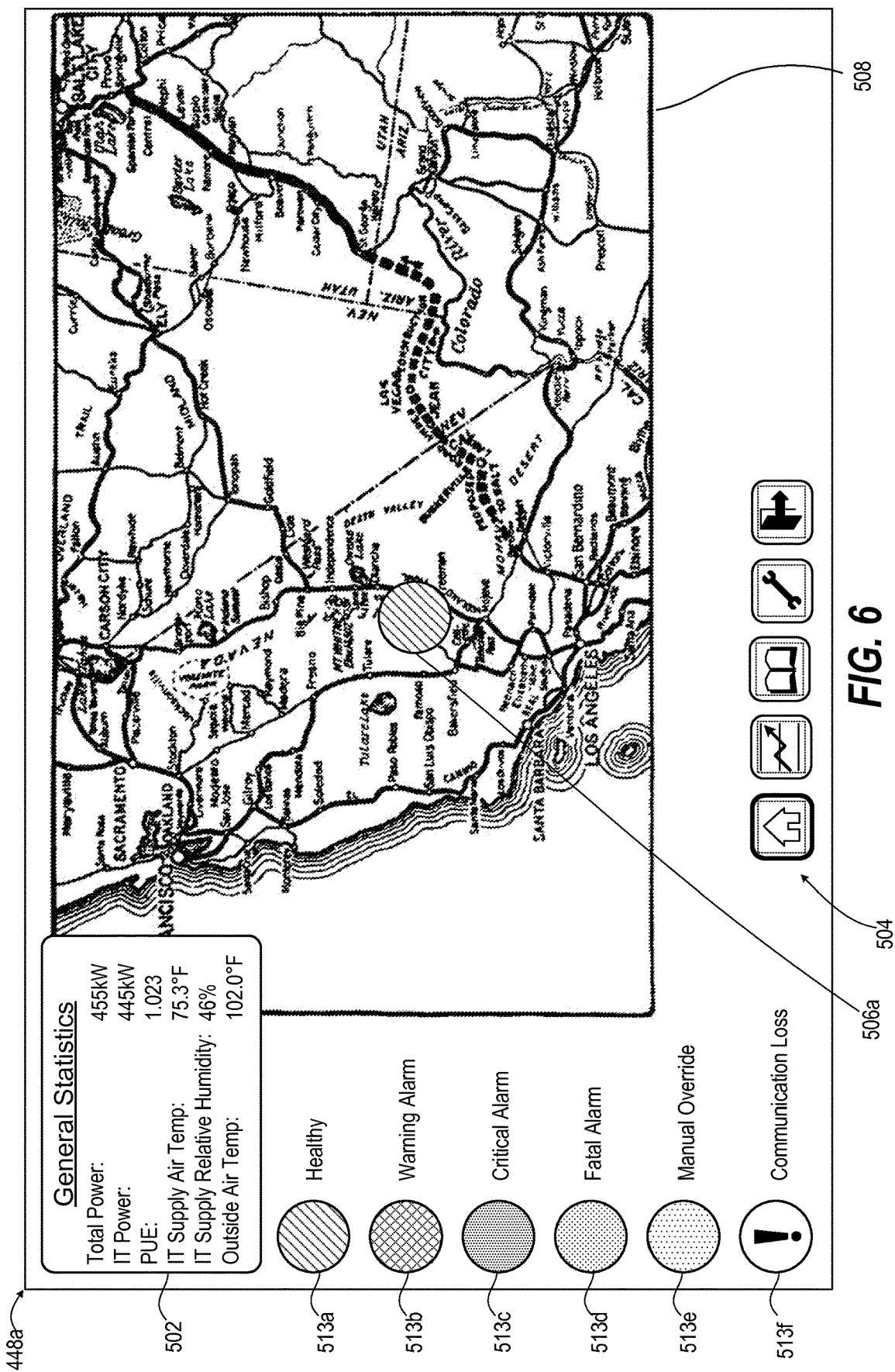
FIG. 6 illustrates the upper-level GUI of FIG. 5 with a change in the scale of the geographic map, according to one or more embodiments.

FIG. 5 illustrates the upper-level GUI 448a with high level statistic legend 502, control keys 504, and location annotations 506a-506d on a geographic map 508. This upper level GUI 448a can provide physical aspects of the city, highways, power infrastructures, with minimal details of each portion of the LIHS 400. The location annotations 506a-506d are colored or patterned according to their respective operating status as specified in color status indications 513a-513f respectively for healthy, warning alarm, critical alarm, fatal alarm, manual override, and communication loss. A location status legend 510 is selected to provide more information about the operating status. FIG. 6 illustrates the upper-level GUI 448a with a change in the scale of the map 508. The map 508 can be geographically accurate, drawn to equally space each location regardless of the actual distance between locations, or drawn with other orientations. In one or more embodiments, the LIHS 400 can be at a single location and thus obviating the need for a map 508.

Figure 7:
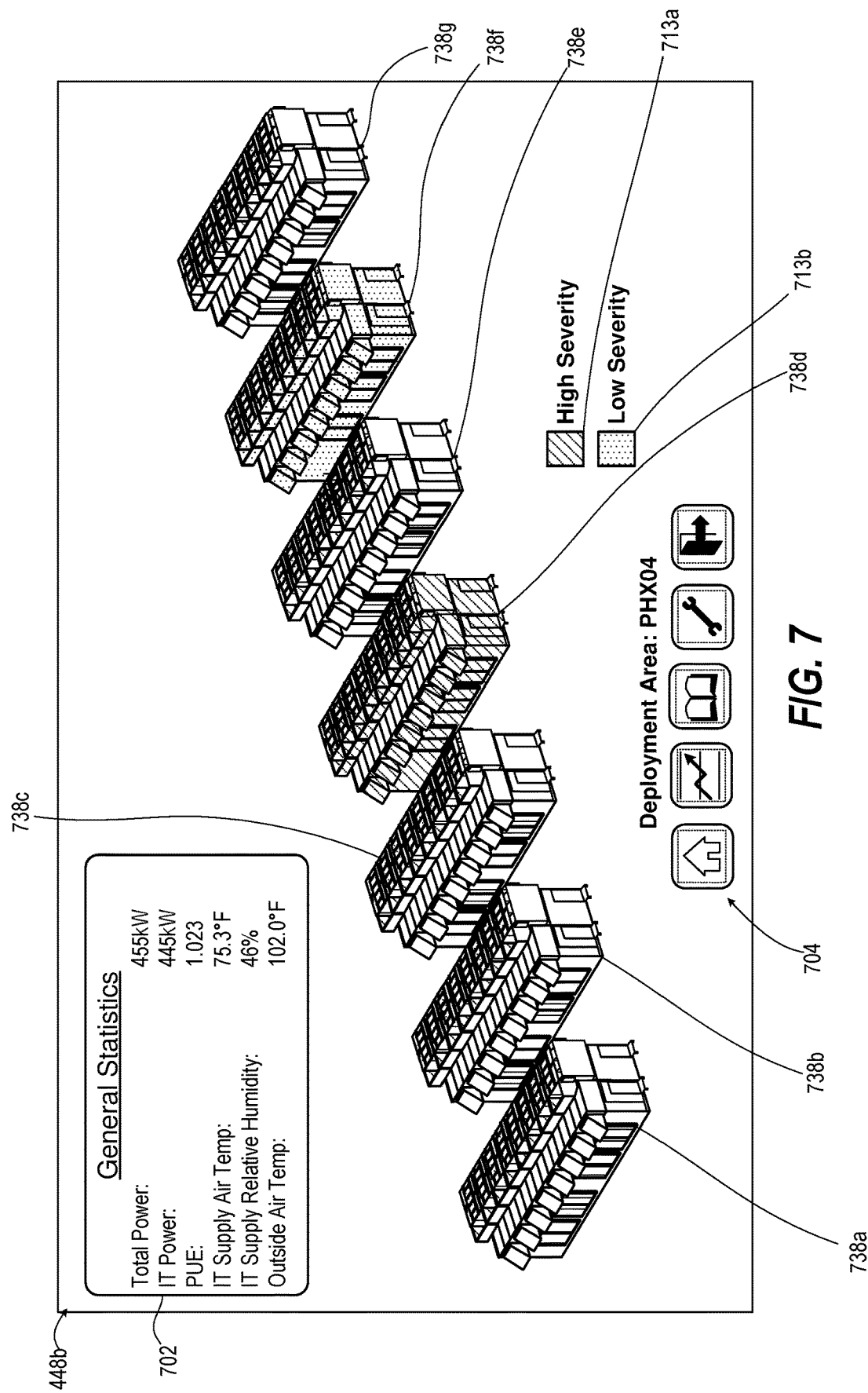
FIG. 7 illustrates a large-scale system level GUI with color or pattern overlays depicting operating or problem status, according to one or more embodiments.
Figure 8:
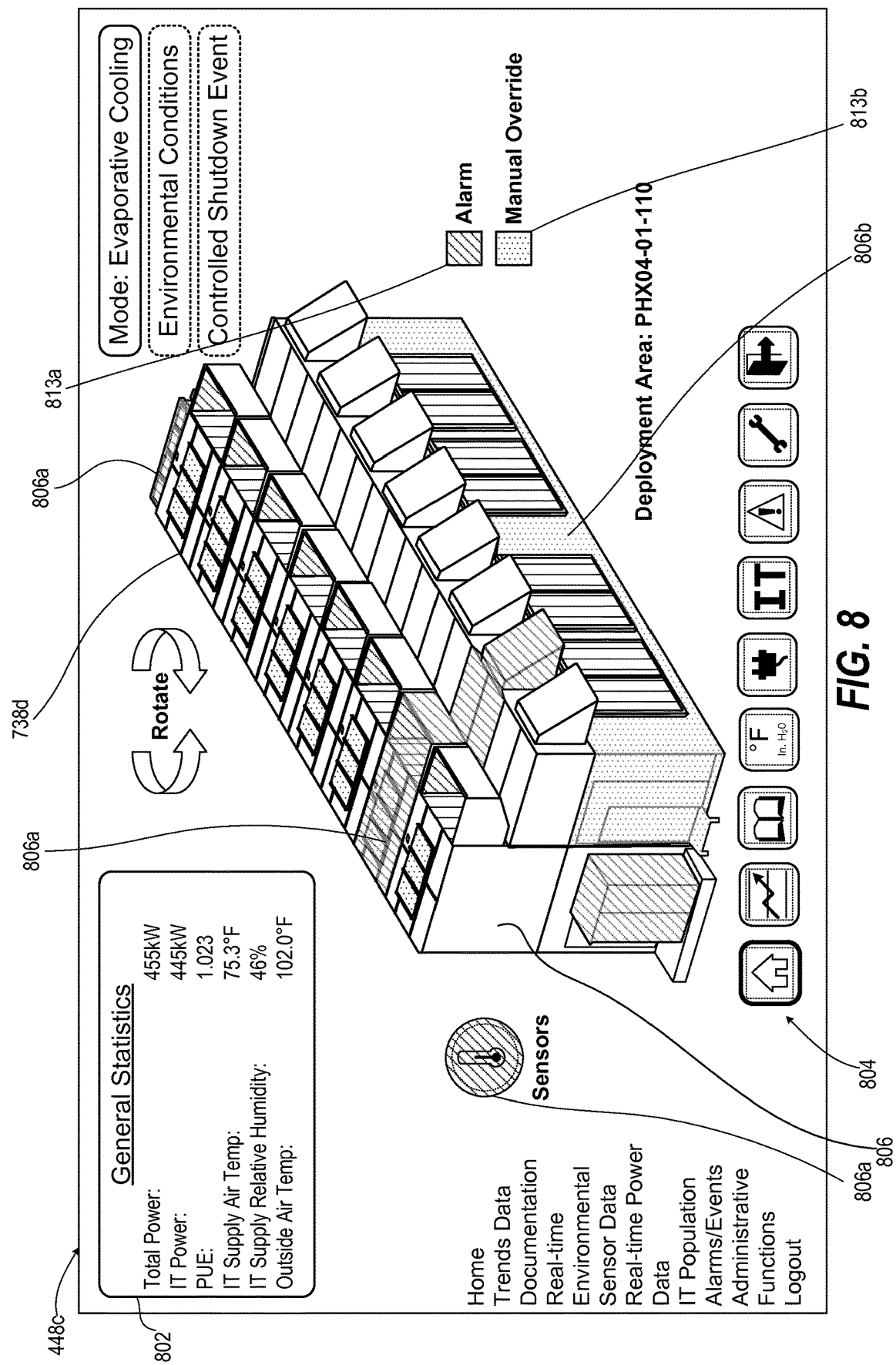
FIG. 8 illustrates a system level GUI with color or pattern overlays depicting operating or problem status, according to one or more embodiments.
Figure 9:
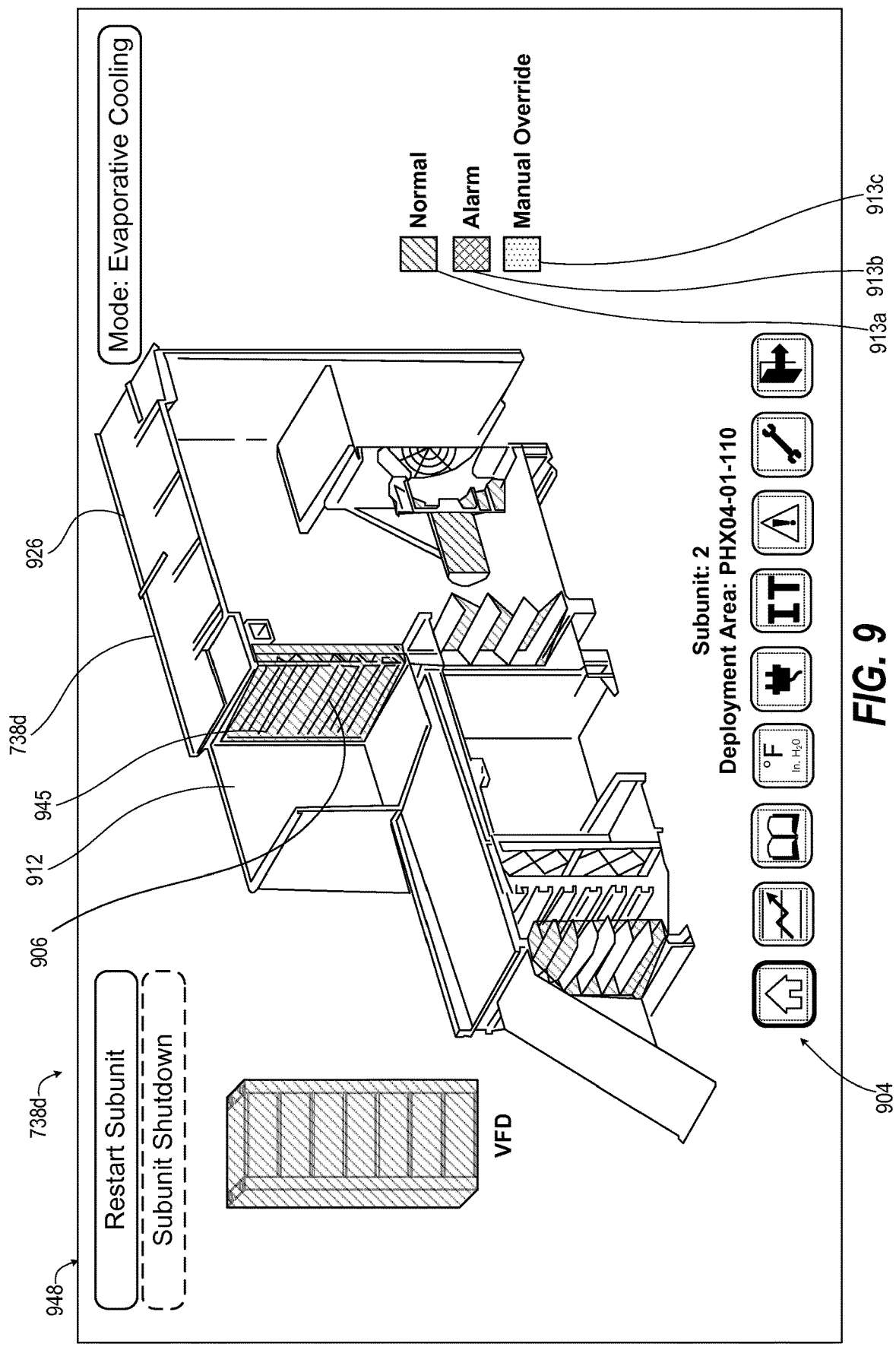
FIG. 9 illustrates a subsystem level GUI with color or pattern overlays for operating or problem status, according to one or more embodiments.
Figure 10:
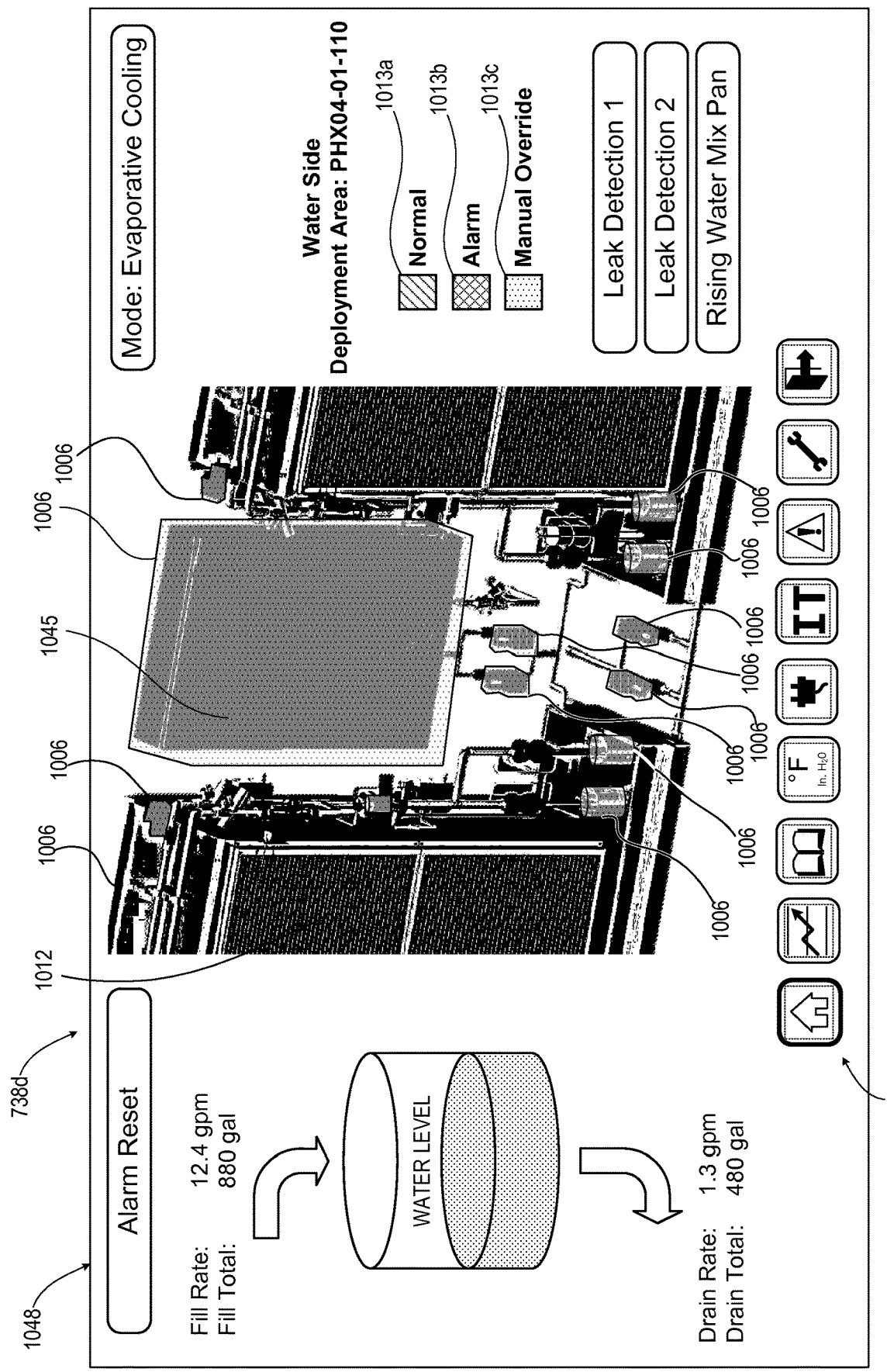
FIG. 10 illustrates an example component level GUI with color or pattern overlays depicting operating or problem status, according to one or more embodiments.
Figure 11:
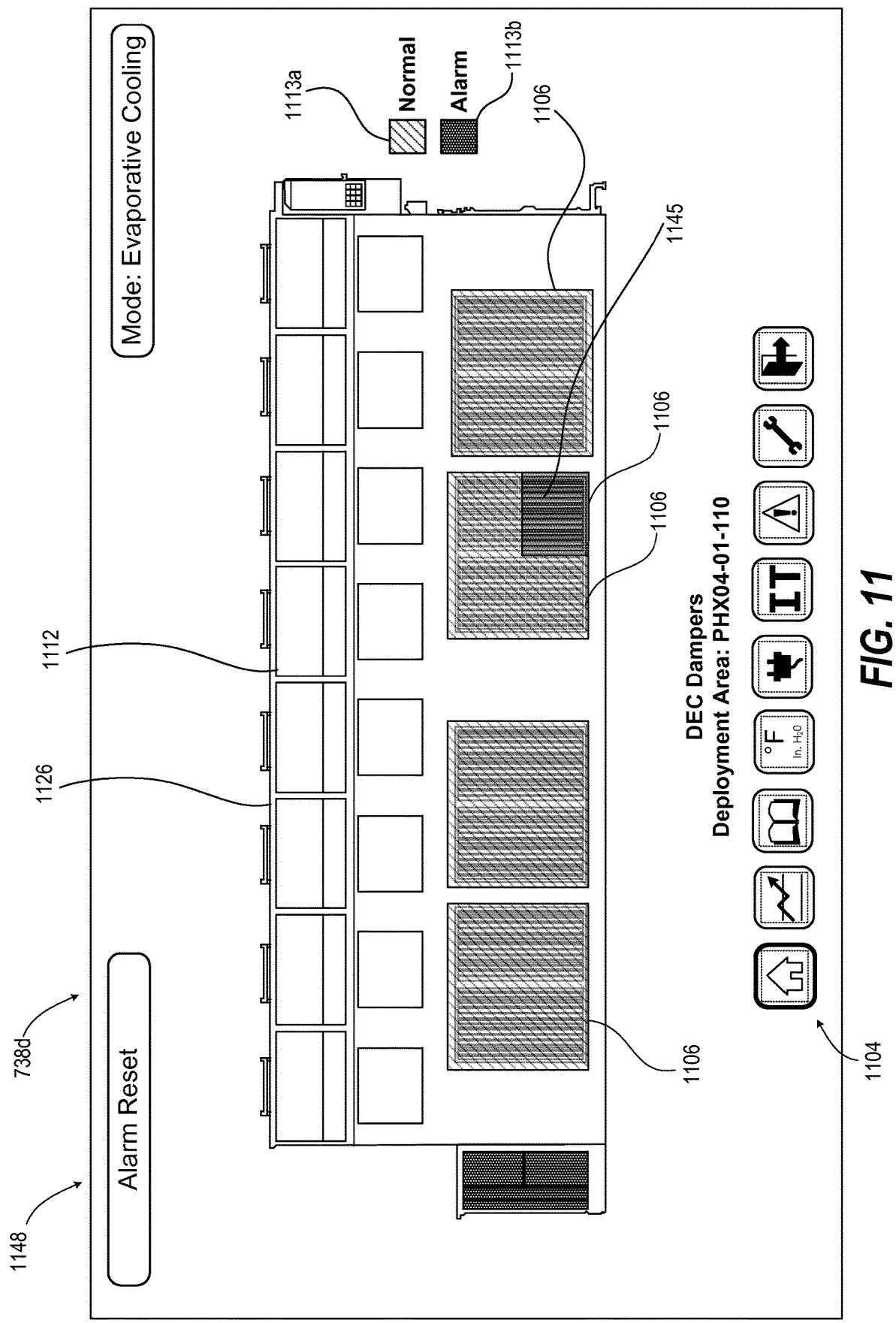
FIG. 11 illustrates an additional example subsystem level GUI with color or pattern overlays depicting operating or problem status, according to one or more embodiments.

FIG. 7 illustrates the large-scale system level GUI 448b with high level statistic legend 702, control keys 704, and MDCs 738a-738g. MDC 738d has a color or pattern overlay 713a for high severity and MDC 738f has a color or pattern overlay 713b for low severity. Within the described embodiments, severity can indicate a level of degradation of performance of particular portion of the LIHS 400. Alternatively or in conjunction, severity can indicate a level of urgency of performing repairs. Severity can also indicate a level of risk to damage to the LIHS 400. The level of severity can be identified with specific color coding at the particular location of the component that is experiencing or exhibiting a problem state (e.g., failure condition provides a red color overlay of the component location). FIG. 8 illustrates a system level GUI 448c with high level statistic legend 802, control keys 804, and a physical presentation 806 of the MDC 738d with color or pattern overlays for grapical status indications 806a for textual status indication 813a and color or pattern overlay 806b for an operating status of manual override 813b. FIG. 9 illustrates a subsystem level GUI 948 with control keys 904, and a physical presentation 926 of a subassembly 912 of MDC 738d with color or pattern overlays for grapical status indications 906 that are explained to correspond for an operating status for functional components 945 respectively of a normal status indication 913a, an alarm status indication 913b and a manual override status indication 913c. FIG. 10 illustrates an example component level GUI 1048 with control keys 1004, and a physical presentation 1026 of a subassembly 1012 of MDC 738d with color or pattern overlays 1006 respectively for an operating status for functional components 1045 respectively of a normal status indication 1013a, an alarm status indication 1013b and a manual override status indication 1013c. FIG. 11 illustrates a subsystem level GUI 1148 with control keys 1104, and a physical presentation 1126 of a subassembly 1112 of MDC 738d with color or pattern overlays 1106 respectively for an operating status for functional components 1145 respectively of normal 1113a and alarm 1113b.

Figure 12:
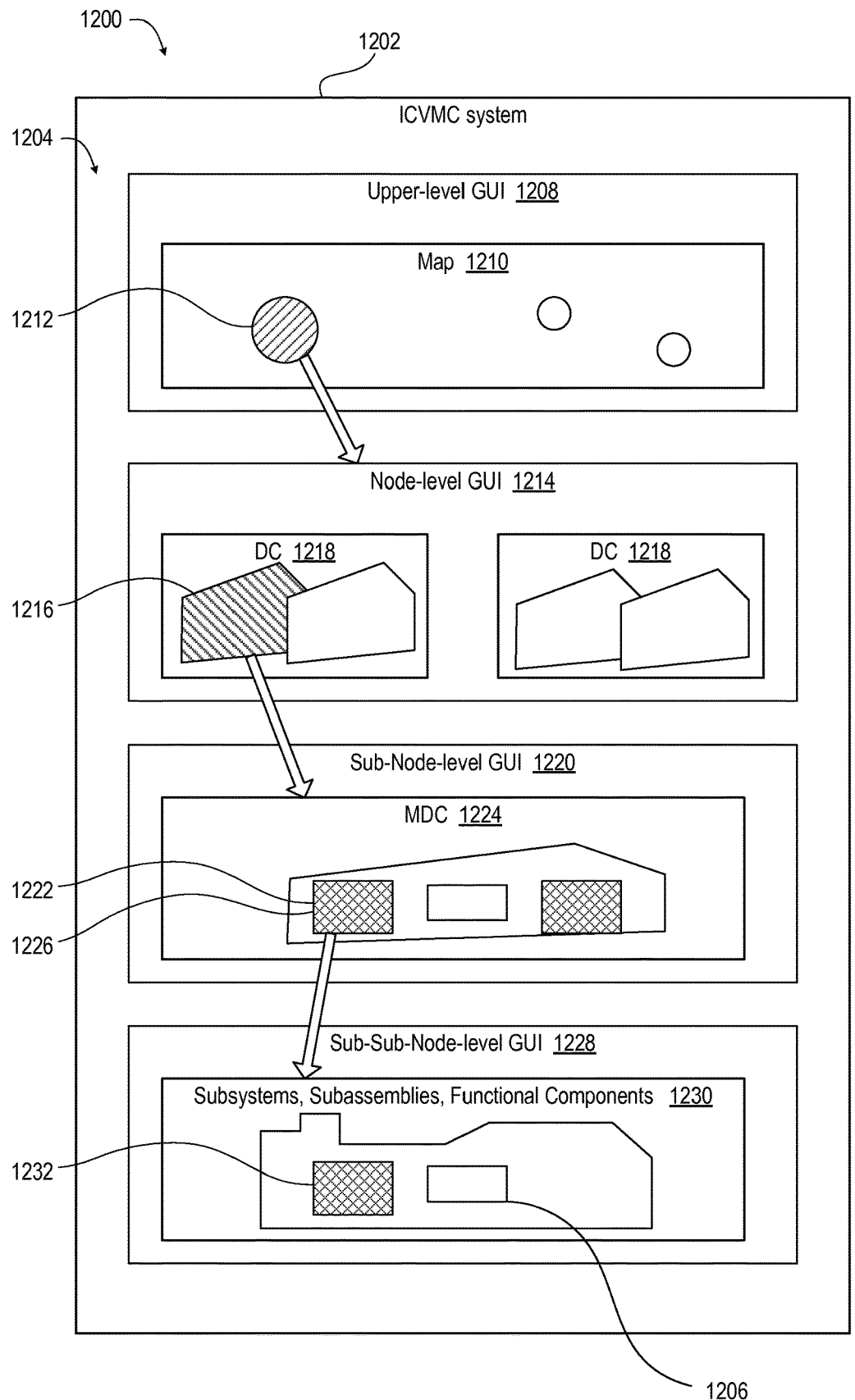
FIG. 12 illustrates a diagram of multi-tier GUIs depicting a failure indication, according to one or more embodiments.

FIG. 12 illustrates an LIHS 1200 having a ICVMC system 1202 that depicts multi-tier GUIs 1204 that enable a user to investigate degraded operating states and failures of functional components 1206. An upper level GUI 1208 can depict geographically displaced portions of the LIHS 1200 on a map 1210. One location indication 1212 can have color, pattern or size, etc. that alerts a user of a status that warrants further investigation. For example, a portion of the LIHS 1200 can indicate requiring maintenance although a severity can be relatively low due to sufficient redundancy at the location to handle the work load. Selecting the location indication 1212 within the upper level GUI 1208 can direct a user to a node-level GUI 1214 with a status indication 1216 for a particular data center 1218 that is operating at a degraded level due to a failure condition. The user can selected the particular data center 1218 to further investigate the failure condition, which selection links to a sub-node GUI 1220 that depicts a particular MDC 1224. Portions 1222 of the MDC 1224 can be annotated with a failure indication 1226. Further investigation can be facilitated by selecting a failed portion 1222 to interact with a lower Sub-Sub-Node level GUI 1228 such as depicting subsystems, subassemblies, functional components, 1230, etc., that have failure indication 1232. The severity of the indication at each level of the multi-tier GUIs 1204 can change with greater granularity of a portion of the LIHS 1200. At a top level, a particular failure may have no discernible impact to performance of the entire LIHS 1200. At the lowest levels of the multi-tier GUIs 1204 a failure can have the highest severity with regard to the operability of an affected subsystem or system.

Figure 13A:
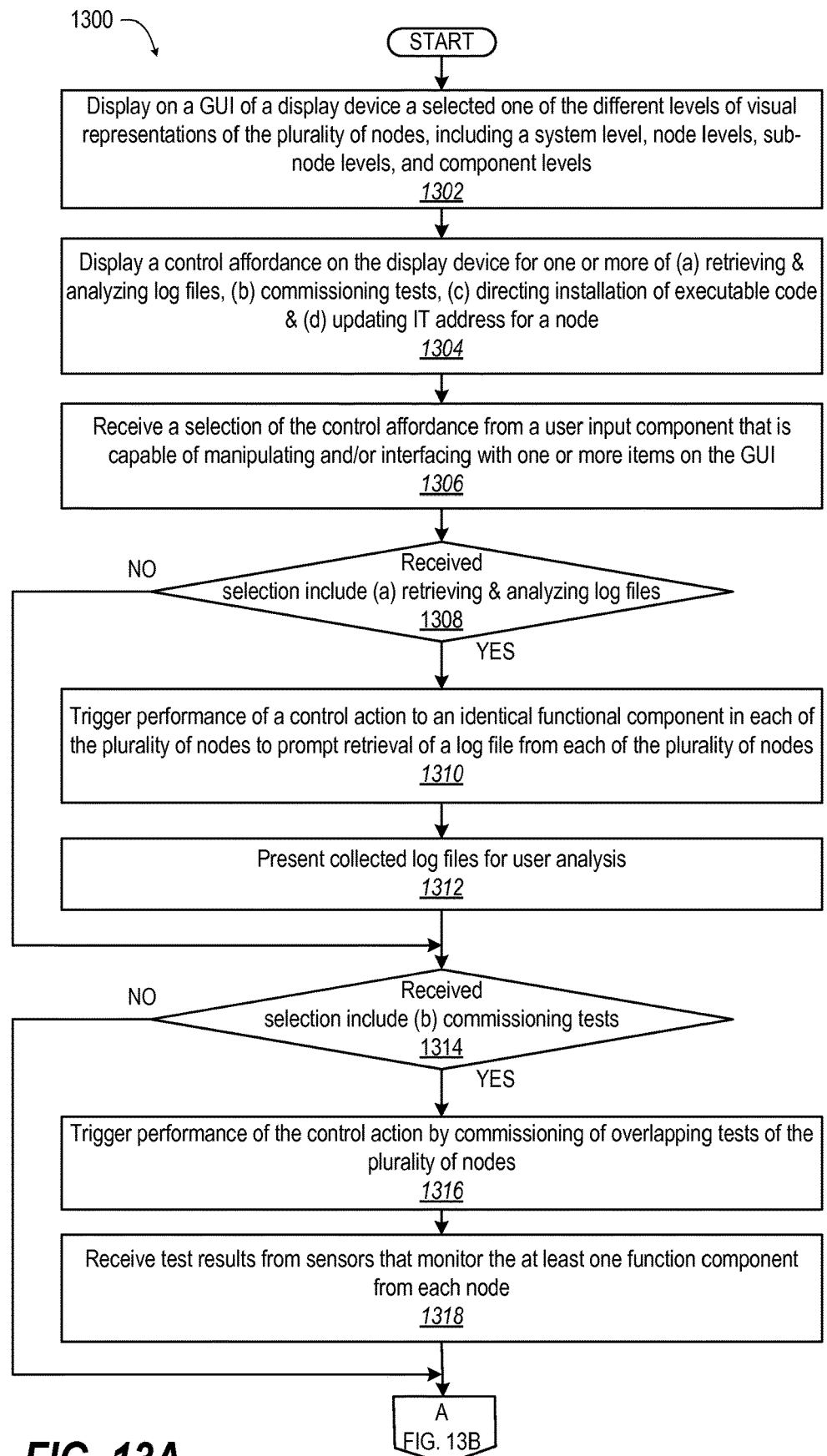
FIGS. 13A-13B illustrate a method of displaying a command affordance and responding to selection of the command affordance by commissioning tests or pushing updates to identical functional components of the LIHS, according to one or more embodiments.
Figure 13B:
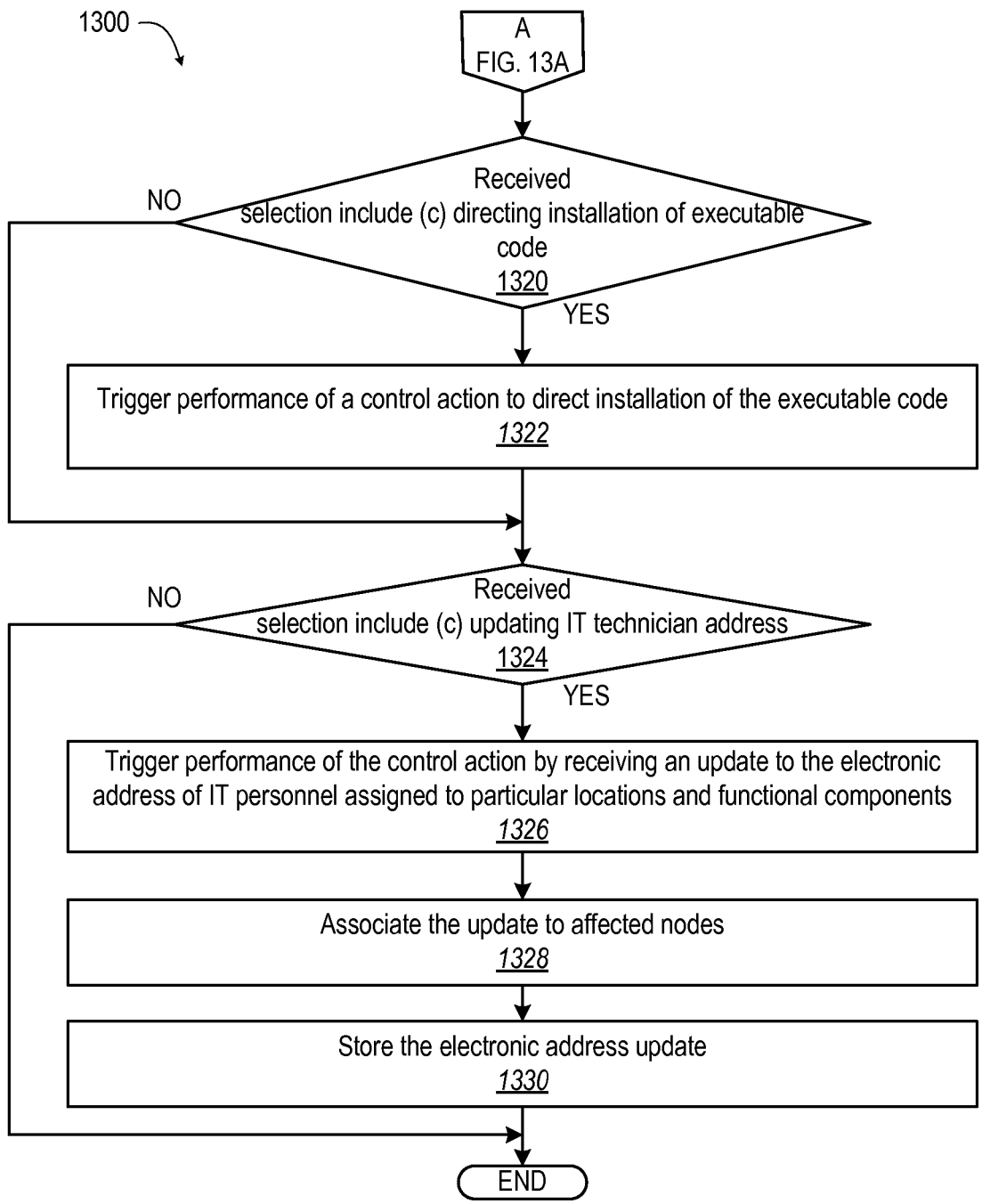

FIGS. 13A-13B illustrate a method 1300 of controlling a LIHS 1200 that includes a plurality of nodes each having at least one functional component. In one or more embodiments, the method 1300 includes displaying on a GUI of a display device a selected one of the different levels of visual representations of the plurality of nodes, including a system level, node levels, sub-node levels, and component levels (block 1302). The method 1300 includes displaying at least one control affordance on the display device for one or more of (a) retrieving and analyzing log files, (b) commissioning tests, (c) directing installation of executable code, and (d) updating an address of IT personnel assigned to a node (block 1304). The method 1300 includes receiving a selection of the control affordance from a user input component that is capable of manipulating and/or interfacing with one or more items on the GUI (block 1306). The method 1300 includes a determination of whether the selection includes retrieving and analyzing log files (decision block 1308). In response to determining in decision block 1308 that the selection included retrieving and analyzing log files, the method includes triggering performance of a control action to an identical functional component in each of the plurality of nodes to prompt retrieval of a log file from each of the plurality of nodes (block 1310). Method 1300 includes presenting the collected log files for user analysis (block 1312). In one or more embodiments, an expert system can augument or replace the user analysis by diagnosing or troubleshooting an abnormal condition based on one or more sensor indications. In response to determining in decision block 1308 that the selection does not include retrieving and analyzing the collected log files or after analyzing the collected log files in block 1312, then method 1300 includes a determination of whether the selection includes commissioning tests (decision block 1314). In response to the determination in decision block 1314 that the selection includes commissioning tests, the method 1300 includes triggering the performance of the control action by commissioning of overlapping tests of the plurality of nodes (block 1316). The method 1300 includes receiving test results from sensors that monitor the at least one functional component from each node (block 1318). In response to the determination in decision block 1314 that the selection does not include commissioning tests or after receiving test results in block 1318, the method 1300 includes determining whether the selection includes pushing executable code to the node (decision block 1320). In response to determining in decision block 1320 that the selection includes pushing executable code to the node, the method 1300 includes triggering performance of the control action by directing installation of executable code on the functional component for correcting a problem state. The executable code can cause the functional component to operate in a malfunction mitigating mode of operation. The executable code can upgrade firmware for improved execution by the functional component (block 1322). In response to determining in decision block 1320 that the selection does not include pushing executable code to the node or after triggering the installation of the executable code in block 1322, the method 1300 includes determining whether the selection includes updating an electronic address for assigned IT personnel to affected nodes (decision block 1324) In response to determining in decision block 1324 that the selection includes updating the electronic address, method 1300 includes triggering the performance of the control action by receiving an update to an electronic address list of IT technicians assigned to particular locations and functional components (block 1326). The method 1300 includes associating an affected node with the update (block 1328). The method 1300 includes storing the electronic address update (block 1330). In one or more embodiments, updating of electronic addresses can be user initiated, facilitated by a control affordance that opens GUI interfaces that are intuitively associated with portions of the LIHS 1200. In one or more embodiments, updating of electronic addresses can be system initiated by a portion of the LIHS 1200 reporting a change in an electronic address. In response to determining in decision block 1324 that the selection does not include updating the electronic address or after directing the update to the affected node in block 1330, method 1300 ends.

In the above described flow charts of FIGS. 13A-13B, one or more of the methods may be embodied in an automated controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood, by those skilled in the art, that various changes may be made and equivalents may be substituted for elements thereof without departing from the scope of the disclosure. In addition, many modifications may be made to adapt a particular system, device or component thereof, and to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of controlling a large-scale information handling system (LIHS) including a plurality of physical nodes each having at least one functional component, the method comprising:

displaying, on a graphical user interface (GUI) of a display device, a selected one of different levels of visual images depicting the physical presentation of physical components at a level or sub-level within one of the plurality of physical nodes, including a system level image, node level images, sub-node level images, and component level images;

displaying at least one one-click control affordance on the display device, the at least one one-click control affordance associated with one or more actions performed at one or more of the plurality of physical nodes, the one or more actions comprising (a) retrieving and analyzing log files, (b) directing installation of executable code, and (c) updating an address of IT personnel assigned to a node;

receiving a selection of one of the at least one one-click control affordance from a user input component that is capable of manipulating and/or interfacing with one or more items on the GUI; and in response to receiving the selection of the one-click control affordance, triggering performance of a specific control action associated with the selected one of the at least one one-click control affordance, the control action provided to an identical functional component in two or more of the plurality of physical nodes, wherein the control action comprises correcting a problem state of the functional component, the problem state involving an upgrade firmware for execution by the functional component and the control action comprising a issuing a command that directs installation of the executable code on the functional component to cause each of the two or more of the plurality of physical nodes to execute the upgraded firmware.

2. The method of claim 1, wherein performing the control action comprises:

collecting a log file from each of the plurality of nodes; and presenting the collected log files for user analysis.

3. The method of claim 1, wherein performing the control action comprises:

commissioning of overlapping tests of the plurality of nodes; and receiving test results from sensors that monitor the at least one function component from each node.

4. The method of claim 1, wherein:

the performing control action comprises directing executable code to the functional component for correcting a problem state of a malfunction mitigating mode of operation for the functional component.

5. The method of claim 1, wherein:

the plurality of nodes comprises a modular data center that contains server systems;

performing the control action comprises:

associating the selection of the one-click control affordance to a select set of two or more types of modular data centers; and directing the executable code to the modular data centers of the select set.

6. The method of claim 1, further comprising:

receiving an update to an electronic address list of information technicians associated with respective ones of the plurality of nodes;

wherein performing the control action comprises:

associating a node at an included location and with the specific functional components that is affected by at least a portion of the update;

in response to the system requiring a technician or technician team: identifying an exact device that has failed or that triggered the condition; identifying a device location within the overall IHS; identifying specific information about required fixes; and sending the identified information about required fixes as a troubleshooting ticket to an electronic address of the technician or technician team; and directing the update to the affected node.

7. A Large-Scale Information Handling System (LIHS) comprising:

a plurality of physical nodes each having at least one functional component;

a network interface enabling communication with a network over which each node of the plurality of physical nodes is connected;

a memory containing visual representations of the plurality of physical nodes with a plurality of different levels of physical presentation via visual images, including a system level image, node level images, sub-node level images, and component level images;

a display device that provides a graphical user interface (GUI) on which each of the different levels of visual images can be presented;

at least one user input component capable of manipulating and/or interfacing with one or more items on the GUI; and an interactive component-level visual monitoring and control (ICVMC) system comprising a processor in communication with the display device, the memory, and the network interface, and ICVMC program modules that execute on the processor, wherein the processor configures the ICVMC system to:

display on the display device a selected one of the different levels of visual images of the physical presentation of physical components at that level or sub-level;

display at least one one-click control affordance on the display device, the at least one one-click control affordance associated with one or more actions performed at one or more of the plurality of physical nodes, the one or more actions comprising (a) retrieving and analyzing log files, (b) directing installation of executable code, and (c) updating an address of IT personnel assigned to a node;

receive a current functional state of functional components at each component level that is being monitored by one or more sensors;

determine an operating status of the at least one functional component from the current functional state received;

display when the operating status includes a problem state;

receive, from the at least one user input component, a selection of one of the at least one one-click control affordance; and in response to receiving the selection of the one-click control affordance, trigger performance of a specific control action associated with the selected one of the at least one one-click control affordance, the control action provided to an identical functional component in two or more of the plurality of physical nodes, wherein the control action comprises correcting a problem state of the functional component, the problem state involving an upgrade firmware for execution by the functional component and the control action comprising a issuing a command that directs installation of the executable code on the functional component to cause each of the two or more of the plurality of physical nodes to execute the upgraded firmware.

8. The LIHS of claim 7, wherein:
the control action comprises collecting a log file from each of the plurality of nodes; and
the ICVMC program modules include code that is executed by the processor to configure the ICVMC system to present the collected log files for user analysis.

9. The LIHS of claim 7, wherein:
each node comprises at least one sensor that monitors the at least one functional component; and
the ICVMC system responds to the selection of the one-click control affordance by:
commissioning overlapping tests of the plurality of nodes; and
receiving test results from the sensors from each node.

10. The LIHS of claim 7, wherein:
the ICVMC program modules comprises executable code for correcting a problem state of a malfunction mitigating mode of operation for the functional component; and
the control action comprises a command that directs installation of the executable code on the functional component to cause operating in a mode for malfunction mitigation.

11. The LIHS of claim 7, wherein:
the plurality of nodes comprise a modular data center that contains server systems;
the control action comprises:
associating the selection of the one-click control affordance to a select set of two or more modular data centers; and
directing installation of the executable code at the modular data centers of the select set.

12. The LIHS of claim 7, wherein:
the ICVMC system receives an update to an electronic address list of information technology (IT) technicians assigned to locations and to specific functional components; and
the control action comprises:
associating a node at an included location and with the specific functional components that is affected by at least a portion of the update;
in response to the system requiring a technician or technician team: identifying an exact device that has failed or that triggered the condition; identifying a device location within the overall IHS; identifying specific information about required fixes; and sending the identified information about required fixes as a troubleshooting ticket to an electronic address of the technician or technician team; and
directing the update to the affected node.

13. The LIHS of claim 7, wherein:
the visual representations comprise three-dimensional computer aided design (CAD) models; and
the ICVMC system displays the visual representations by rendering the CAD models at a user selected spatial orientation.

14. An interactive component-level visual monitoring and control (ICVMC) system of a large-scale information handling system (LIHS) including a plurality of nodes each having at least one functional component, the ICVMC system comprising:

a network interface enabling communication with a network over which each node of the plurality of physical nodes is connected;

a memory containing visual representations of the plurality of physical nodes with a plurality of different levels of physical presentation via visual images, including a system level image, node level images, sub-node level images, and component level images;

a display device that provides a graphical user interface (GUI) on which each of the different levels of visual images can be presented;

at least one user input component capable of manipulating and/or interfacing with one or more items on the GUI; and a processor in communication with the display device, the memory, and the network interface, and ICVMC program modules which execute on the processor, wherein the processor configures the ICVMC system to:

display on the display device a selected one of the different levels of visual images of the physical presentation of physical components at that level or sub-level;

display at least one one-click control affordance on the display device, the at least one one-click control affordance associated with one or more actions performed at one or more of the plurality of physical nodes, the one or more actions comprising (a) retrieving and analyzing log files, (b) directing installation of executable code, and (c) updating an address of IT personnel assigned to a node;

receive, from the at least one user input component, a selection of one of the at least one one-click control affordance; and in response to receiving the selection of the one-click control affordance, trigger performance of a specific control action associated with the selected one of the at least one one-click control affordance, the control action provided to an identical functional component in two or more of the plurality of physical nodes, and wherein the control action comprises correcting a problem state of the functional component, the problem state involving an upgrade firmware for execution by the functional component and the control action comprising a issuing a command that directs installation of the executable code on the functional component to cause each of the two or more of the plurality of physical nodes to execute the upgraded firmware.

15. The ICVMC system of claim 14, wherein:
the control action comprises collecting a log file from each of the plurality of nodes; and
the ICVMC system performs diagnostics by presenting the collected log files for user analysis.

16. The ICVMC system of claim 14, wherein:
each node comprises one or more sensors to monitor the at least one functional component; and
the ICVMC system performs the control action by:
commissioning of overlapping tests of the plurality of nodes; and
receiving test results from the sensors from each node.

17. The ICVMC system of claim 14, wherein:
the memory contains executable code for correcting a problem state of a malfunction mitigating mode of operation for the functional component; and
the ICVMC system performs the control action by directing the executable code to the functional component.

18. The ICVMC system of claim 14, wherein:
the plurality of nodes comprises a modular data center that contains server systems;
the ICVMC system performs the control action by:
associating the selection of the one-click control affordance to a select set of two or more types of modular data centers; and
directing the executable code to the modular data centers of the select set.

19. The ICVMC system of claim 14, wherein:
the ICVMC system receives an update to an electronic address list of information technicians associated with respective ones of the plurality of nodes; and
the ICVMC system performs the control action by:
associating a node at an included location and with the specific functional components that is affected by at least a portion of the update;
in response to the system requiring a technician or technician team: identifying an exact device that has failed or that triggered the condition; identifying a device location within the overall IHS; identifying specific information about required fixes; and sending the identified information about required fixes as a troubleshooting ticket to an electronic address of the technician or technician team; and
directing the update to the affected node.

20. The ICVMC system of claim 14, wherein:
the visual representations comprise three-dimensional computer aided design (CAD) models; and
the ICVMC system displays the visual representations by rendering the CAD models at a user selected spatial orientation.

* * * * *